Nov. 30, 1971  J. P. CAILLEY  3,623,918
APPARATUS AND METHOD FOR MANUFACTURING SPIRAL WINDINGS OF
ELECTRODE AND SEPARATOR STRIPS FOR
ELECTROCHEMICAL GENERATORS
Filed Dec. 18, 1969  3 Sheets-Sheet 1
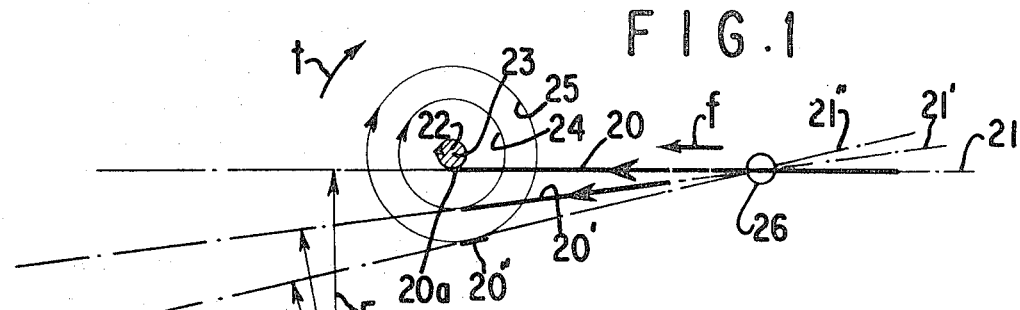
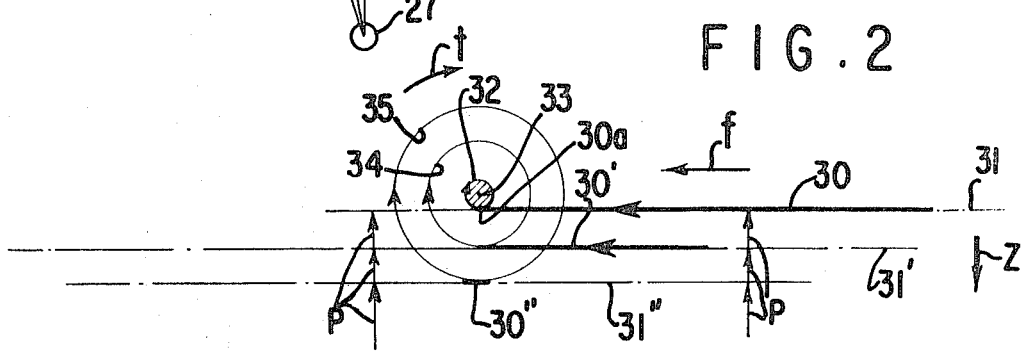
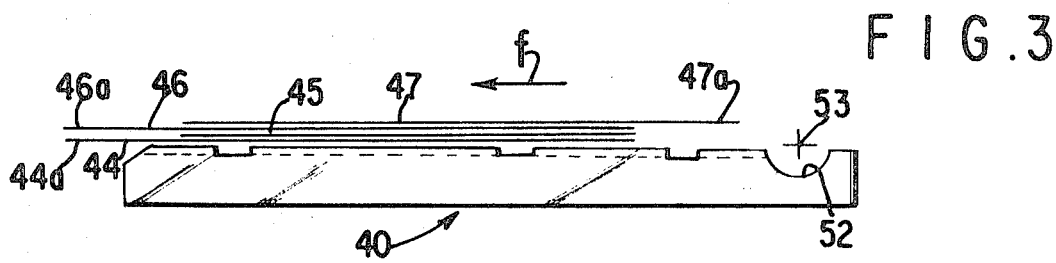
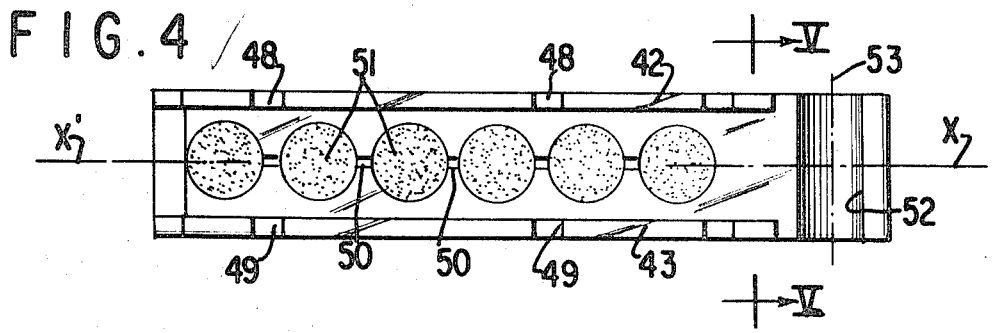
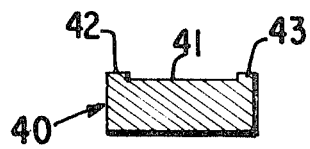
INVENTOR
JEAN PIERRE CAILLEY
BY
Kenyon & Kenyon Reilly Carr & Chapin
ATTORNEY

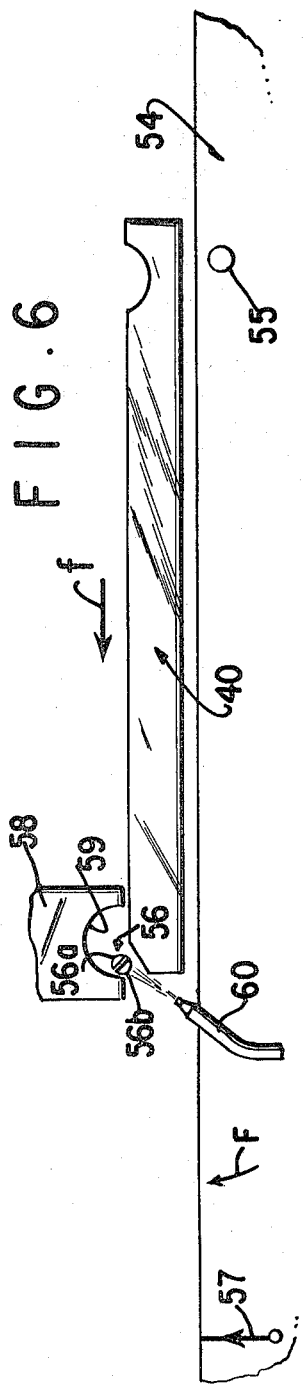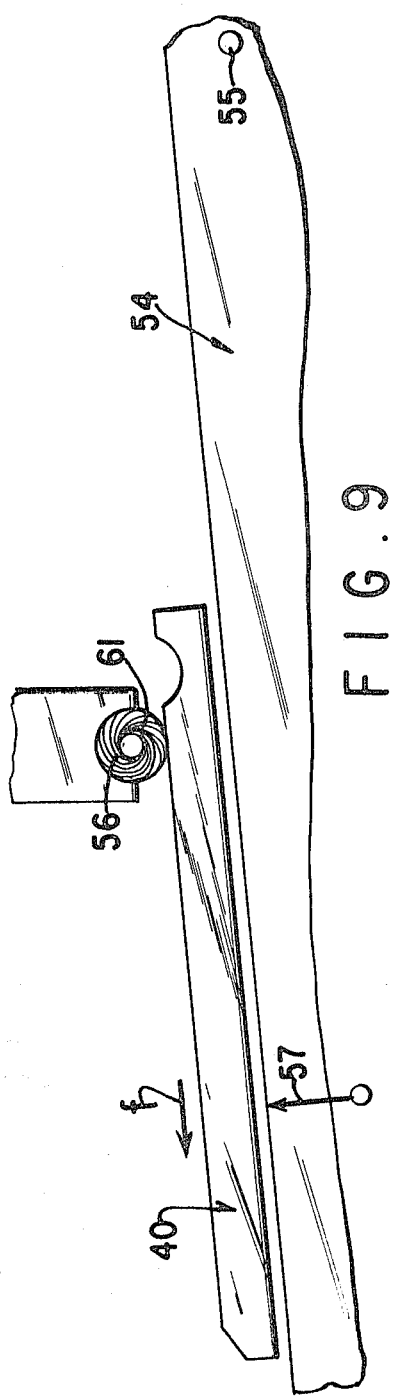

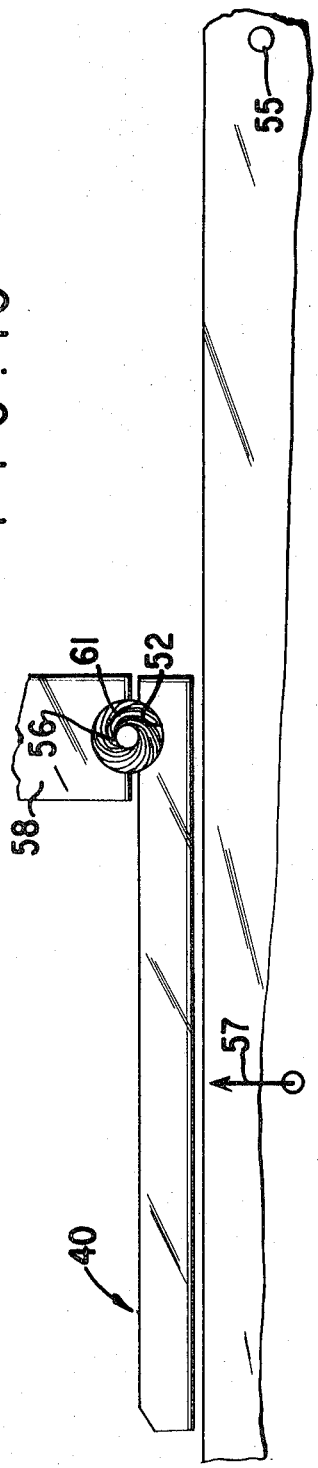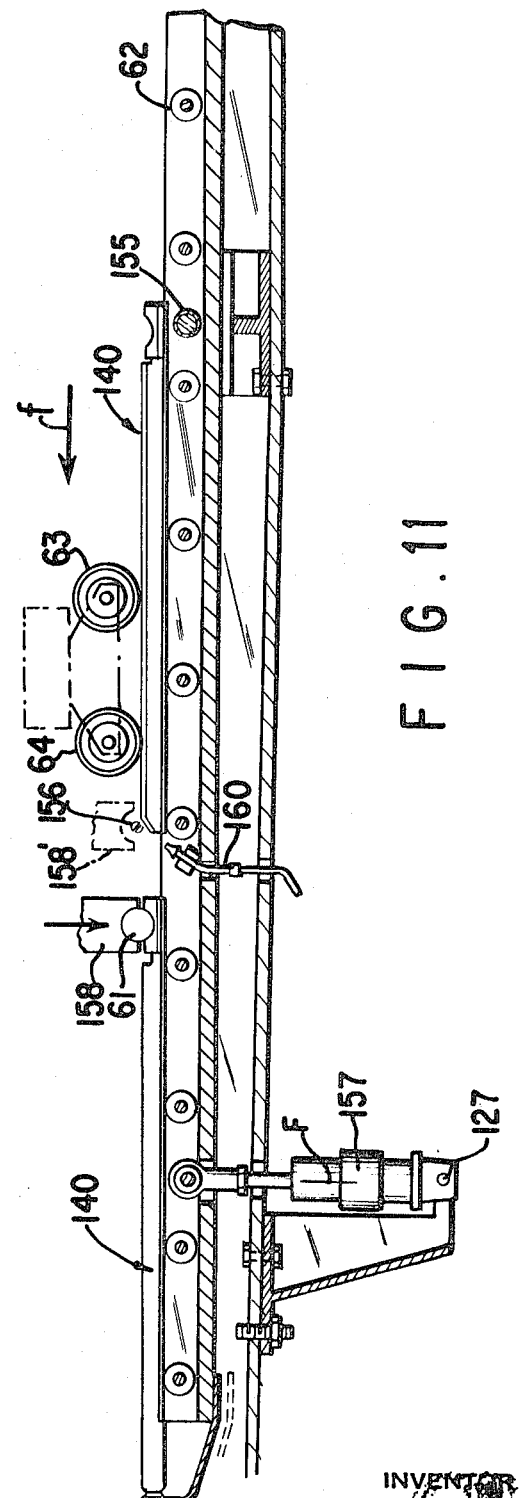

United States Patent Office 3,623,918
Patented Nov. 30, 1971

3,623,918
APPARATUS AND METHOD FOR MANUFACTURING SPIRAL WINDINGS OF ELECTRODE AND SEPARATOR STRIPS FOR ELECTROCHEMICAL GENERATORS
Jean Pierre Cailley, Ambares, France, assignor to Societe des Accumulateurs Fixes et de Traction (Societe Anonyme), Romainville, France
Filed Dec. 18, 1969, Ser. No. 886,196
Claims priority, application France, Dec. 20, 1968, 179,750
Int. Cl. H01m 37/00
U.S. Cl. 136—175        16 Claims

ABSTRACT OF THE DISCLOSURE

A spiral winding of superposed electrode and separator strips for electrochemical generators embodying wound electrodes and separators is effected by arranging a stack of electrode and separator strips in appropriate order on a guide rollable along a supporting bench to move the stack into proximity of a winding mandrel, whereat leading portions of the separator strips projecting forwardly of the stack on the guide are directed to and engaged by the mandrel which is then rotated causing spiral winding up of all the strips of the stack on said mandrel while simultaneously effecting translational displacement of the guide on the bench so that the guide accompanies the stack during the winding without occurrence of any translational movement of the stack in relation to the guide. Simultaneously, with this translational displacement of the guide a pivoting movement is imparted to the bench about an pivotal support whose axis is parallel to that of the mandrel so that at each instant during winding on the mandrel the electrode and separator strips of the stack on the guide arrive substantially tangentially to the spiral thereof being wound on the mandrel.

BRIEF SUMMARY OF INVENTION

The present invention concerns essentially a method of and an apparatus for the manufacture of electrochemical generators having wound electrodes; such generators comprise more particularly alkaline accumulators whose electrodes have a thin sintered support.

In U.S. Pat. No. 3,298,871 of Jan. 17, 1967, the patentees thereof therein set out various difficulties presented in the manufacture of accumulators having wound electrodes and gave a solution therefor. This patent was concerned more particularly with preventing deterioration of the electrode strips at the ends at which the winding was started, these ends being introduced into a mandrel and bent over at a right angle at the edge of the mandrel slot. A protective flexible adhesive strip was provided to consolidate and protect the electrodes at these ends.

The patented method, although effective, does not readily lend itself to automation of the winding operation, with the result that the assembly of an accumulator with such wound electrodes takes a relatively great time. Moreover, the separator and electrode strips were disposed on fixed guides and driven by the rotation of the mandrel slip on these guides, so that during winding when the spiral reaches a certain diameter the strips leave their guides, which are no longer tangential to the spiral being wound. The tractive forces to which the strips are subjected do not remain constant and this results in danger of misalignment of the strips and distortion of the winding. At the same time, the slipping of the strips on the guides introduces considerable frictional forces which slow down the winding operation and are likely to have a detrimental effect on the strips.

The present invention has among its objects obviating the aforesaid disadvantages.

The method of forming a winding from superimposed electrode and separator strips in accordance with the present invention, whereby the aforesaid difficulties can be obviated, is distinguished notably in that the electrode and separator strips are stacked in the appropriate order on a movable guide of elongate form, the separator strips projecting at least at the end of the stack in direction of motion of the guide, in that the said guide brings the said stack into proximity to a mandrel, in which the projecting ends of the separators are then engaged. Thereafter, the said mandrel starts to turn, while the guide continues its translational movement in order to accompany the stacked electrode and separator strips during their winding around the mandrel without any translational movement of the stack in relation to the guide taking place, and in that the guide also undergoes a pivoting movement during its translation about an axis parallel to the axis of the mandrel, the said translational and pivoting movements of the guide being so combined that the plane of the guide bearing the stacked electrode and separator strips arrives tangentially to the spiral winding being formed of the stacked electrodes and separators.

In accordance with one variant, the pivoting movement of the guide may be replaced by a translational movement thereof always perpendicular to the axis of the mandrel and to the plane of the guide supporting the strips, thus always insuring a tangential arrival of the stack to the spiral winding being formed.

In an advantageous embodiment of the invention, the spiral winding, when completed, continues to turn about the mandrel for a few turns, in a cylindrical space having as its diameter the desired final dimensions of the wound sprial, and leaves this space only in order to be directly inserted into a cup intended to serve as a receptacle for the accumulator.

Thus, in accordance with the invention, no relative translational movement takes place between the guide and the stacked electrode and separator strips at any instant during the winding operation. At the same time, the strips always arrive tangentially to the spiral formed. In addition, since only the leading projecting ends of the two separator strips are ever engaged in the mandrel, no electrode strip of the stack is bent over at a right angle and this at the same time automatically protects the ends of the electrodes which cannot come into direct contact with the mandrel. Constancy of the tractive forces on the stacked electrode and separator strips during winding is also ensured.

In addition, the completed spiral continues to be rotated briefly about the mandrel in the aforesaid cylindrical space or recess which limits its diameter to its final dimensions, whereafter it is extremely simple to introduce this appropriately limited spiral into the cup which is to serve as a receptacle for the accumulator.

The method of manufacture according to the invention therefore lends itself particularly well to large scale automatic production and in addition is very reliable and very safe.

Another object of the invention also is the provision of apparatus for carrying out such a winding method. The apparatus according to the invention is distinguished notably in that it comprises a guide of elongate form which has a surface on which the stacked electrode and separator strips can be deposited, means for bringing and pressing the said surface of the said guide substantially tangentially against the said mandrel or the winding formed thereon, and means for shifting the said guide in a translational movement during winding.

In accordance with a preferred form of construction, the guide consists of a substantially parallelpipedic elongate member whose upper face forms the aforesaid receiving surface for the stacked electrode and separator strips, and it is supported by a bench which pivots about an axis parallel to the axis of the mandrel and which may be urged in the direction of the said mandrel through the intermediary of pressure means such as jacks, springs or the like. Rolling means enable the guide to move along the bench without appreciable friction during the winding of the stacked electrode and separator strips.

In accordance with another form of construction, the bench supporting the guide travels with a translational movement always perpendicular to the axis of the mandrel, which is equivalent to shifting to infinity the aforesaid pivoting axis, all other conditions remaining the same.

The invention will become more clearly apparent with the aid of the following description of a number of forms of construction designed in accordance with the invention and illustrated in the accompanying drawings, which are given solely by way of example and in which:

FIGS. 1 and 2 are basic diagrams illustrating respectively two variants of winding methods according to the invention;

FIG. 3 diagrammatically illustrates four separator and electrode strips superimposed as a stack in the desired order, and all positioned on a translatorily movable guide according to the invention;

FIG. 4 is a top plan view of the guide illustrated in FIG. 3;

FIG. 5 diagrammatically illustrates in section the contour of the guide, for example, at the plane of line V—V of FIG. 4;

FIG. 6 diagrammatically illustrates an apparatus designed in accordance with the invention, which operates in accordance with the winding principle illustrated in FIG. 1, employing a guide of the type illustrated in FIGS. 3 to 5;

FIGS. 7 to 10 diagrammatically illustrate successive phases of the winding operation performed by means of the apparatus illustrated in FIG. 6; and FIG. 11 illustrates in more precise detail a winding apparatus of the type illustrated in FIG. 6.

DETAILED DESCRIPTION

In the winding method according to the invention as diagrammatically illustrated in FIG. 1 appropriately stacked electrode and separator strips 20 are fed on a guide 21 in such manner that the leading projecting ends of the forward end 20a of the stacked strips can be engaged by the mandrel 22 for winding the stacked strips thereon. The stacked strips 20 arrive initially tangentially to the winding surface of the mandrel 22.

As the winding progresses, i.e. as the mandrel 22 rotates in the direction of the arrows $t$, the stacked strips 20 with their guide 21 pivot about the axis of a pin 26 parallel to the axis 23 of the mandrel, so that the stacked strips always arrive tangentially to the surface of the winding formed on the mandrel 22 and no slipping takes place between the stacked strips 20 and their guide during such winding.

Illustrated at 20′, 21′ and 20″, 21″, are the positions assumed by the stacked strips 20 and the guide 21 as the winding on the mandrel achieves successively the circumference 24 and then the circumference 25.

As indicated by the force arrows F, the guide 21 is applied with pressure against the winding being formed on the mandrel 22 at each instant during the winding operation, so that the stacked electrode and separator strips always arrive substantially tangentially to the circumference of the winding being formed at each instant on said mandrel 22.

The forces F may be applied as by a jack, which is then advantageously pivotally mounted to pivot a pin whose axis is parallel to the axis of pin 26 of the guide 21 and axis 23 of mandrel 22.

Advantageously, as will hereinafter become apparent particularly from the detailed description of FIG. 11, the stacked electrode and separator strips are positioned on the surface of a rigid guide 21 which guide can slide longitudinally for example, by rolling freely on a support bench which latter pivots about the axis of a pin such as the pin 26, and is urged under pressure toward the winding mandrel by forces F derived from a jack or the like which is adapted to pivot about the axis of a fixed pin such as pin 27. There is thus very simply obtained the double movement comprising the pivoting of the support of the electrode and separator strips and the accompanying movement of these strips during the progress of the winding.

In accordance with the embodiment illustrated in FIG. 2, in which the same numerals increased by ten units, are used to denote like parts shown in FIG. 1, the guide support 31 of the stacked electrode and separator strips 30 travels parallel to itself with a longitudinal translational movement perpendicular to axis of pin 33 of the winding mandrel 32. Simultaneously with this translational movement, the guide 31 of the stacked electrode and separator strips 30 travels with a vertical translational movement of its own plane simultaneously with the said strips, so that here again there is no relative sliding between the said stacked strips 30 and their support guide. It will be observed that the displacement of the guide 31 takes place both in the longitudinal direction of the arrow $f$ and in the vertical direction of the arrow $z$. The arrows P diagrammatically indicate the vertical thrust exerted on the guide 31 to maintain the stacked strips 30 in tight contact with the winding which is being formed on the mandrel.

Reference will now be made specifically to FIGS. 3 to 5.

In these figures, there is diagrammatically shown a guide 40 which has a substantially parallelepipedic elongate form with an upper recess 41 defined between two ledges 42, 43, on the surface of which recess 41 there are successively stacked first a separator strip 44, then, a, for example, positive electrode strip 45 having a sintered nickel support, then a further separator strip 46 and then a negative electrode strip 47. These strips are successively stacked and positioned in the recess or passage 41 between the defining ledges 42, 43, which are optionally formed with side openings 48 and 49 to accommodate connecting lugs (not shown) that may be parts of the respective electrode strips when such lugs are provided thereon.

As will be more clearly apparent from FIG. 3, the separator strips 44, 46 project forwardly from the stack at one of their ends as at 44a, 46a in the stack, while the negative electrode 47 advantageously projects outwardly beyond the rear of the stack as illustrated at 47a. The reason for this arrangement will become apparent later.

In order to facilitate the positioning and retention of the various separator and electrode strips in the recess 41 of the guide 40, the bottom of the passage 41 may advantageously be formed with suction orifices 50 through which suction may be directed to draw and maintain the separator strips regularly and securely within the interior of the said recess or passage 41. Permanent magnets 51 may in addition be provided to maintain the whole stack in its applied position in said recess by acting magnetically on the iron or nickel constituents of the electrodes themselves.

In its rear part (in relation to the direction of advance of the guide, which will take place in the direction of the arrow $f$), the guide 40 has a semi-cylindrical recess 52, whose axis 53 is situated substantially in the upper plane of the guide 40 and is directed perpendicularly to the longitudinal direction X'—X' of the greater length of the guide corresponding to the direction of travel of the electrode and separator strips.

As illustrated in FIG. 6, which relates to an apparatus for carrying out the winding method principle of FIG. 1, the guide 40 with its stacked electrode and separator strips (not shown) is disposed on a bench 54 which rocks about a pin 55 (performing the function of the pin 26 of FIG. 1) which extends parallelly with the axis of the mandrel 56 on which the stacked electrode and separator strips are to be wound.

The guide 40 slides on the bench 54 in the direction of the arrow f, for example, with the aid of rollers provided for this purpose (see in detail at 63 in FIG. 11). A device such as a jack, diagrammatically represented by the arrow 57, acts on the bench 54 in the direction of the arrow f when the latter pivots about the pin 55, thus biasing toward and maintaining the guide 40 tangentially against the winding being formed around the mandrel. A member 58 serving to guide the winding operation, as will hereinafter be apparent, so-operates with the mandrel 56. At the completion of the winding operation (FIG. 10), the semi-cylindrical recess 59 in the member 58 is positioned opposite the semi-cylindrical recess 52 in the guide 40 and defines a cylinder which determines the final diameter of the winding on a mandrel 56. The member 58 is not fixed in relation to the axis of the mandrel 56 during the winding operation on the latter.

Also, as can be seen at 60, an air blast nozzle is located in proximity to the mandrel 56.

The operation of the apparatus will now be described more particularly with reference to FIGS. 6 to 10.

As diagrammatically illustrated in FIG. 7, when the forward end 40a of the guide 40 arrives under the mandrel, one-half 56b (FIG. 6) having been withdrawn by axial sliding, air from air blast nozzle 60 blows on and bends the leading ends 44a, 46a of the separator strips 44 and 46 which extend forwardly of the stack, around the remaining half 56a of the mandrel. An instant later, the half-mandrel 56b returns into position, thus engaging the bent around ends 44a and 46a of the separator between the two mandrel halves 56a and 56b and the winding operation commences as illustrated in FIG. 8, which illustrates the condition of the winding after a half-revolution of the mandrel 56.

The winding on mandrel 56 continues to progress while the bench 54 occupies, under the combined action of the jack 57 and of the pivot pin 55, the pivoted position necessary to enable the guide on which the stacked electrode and separator strips are applied to arrive substantially tangentially to the winding being formed on the mandrel at each instant. At the same time, the guide 40 slides or rolls forwardly in the direction of the arrow f on the bench 54. From the outset, the member 58 exerts on appropriate pressure, through at least a part of its contour 59, on the winding being formed, so as to produce a regular winding on said mandrel.

At the end of the winding operation, as illustrated in FIG. 10, the stacked electrode and separator strips have been wound around the mandrel 56. Then the completed winding 61 so formed falls into the recess 52 in the guide 40, while still being maintained by the guide member 58, which is then centered with respect to the mandrel 56, the axis of which remains at a fixed location. As the mandrel 56 thereafter continues to rotate, for example, through three or four revolutions, the winding 61 is gripped in the cylindrical space of the opposed semicylindrical recesses 59 and 52 in the member 58 and in the guide 40. It is to be noted that the rearwardly projecting portion 47a of negative electrode 47 forms the outside turn of the completed winding, and can thus be brought into contact with the metal cup into which the complete winding 61 is to be introduced. The positive electrode 45, on the other hand, remains insulated in the completed winding between the separators 44 and 46.

After the winding 61 has been completed to the desired diameter, it may be automatically introduced into cups, for example, of metal, which will constitute the side walls of the casing of the electrochemical generator. For this purpose, the pins 56a and 56b of the mandrel are retracted from the winding and the assembly now of the guide 40 and the member 58 bearing the winding 61 held between the surfaces 52 and 59 are moved into a position in front of a station for introduction of the completed winding into the cup (not shown).

Reference will now be made to FIG. 11, in which, for example, an apparatus in greater detail of the type illustrated in FIGS. 3 to 10 could be constructed. In FIG. 11, parts performing the same function as in the apparatus illustrated in FIGS. 3 to 10 are denoted by the same numerals, increased however by 100 units. This FIG. 11 illustrates the condition apparatus at the time when the finished electrode and separator winding 61 can be introduced into the metallic cup of an electrochemical generator.

In this FIG. 11, it will be seen that a guide such as 140 corresponding to guide 40 travels freely by rolling on rollers 62 in direction of arrow f along a bench 154 rockably mounted on a shaft 155, the bench 154 being subjected to the action of the jack 157 in the direction of the arrow f. The jack 157 is pivotally mounted on a fixed pin 127. There will be seen at 160 the air blast nozzle which blows the ends of the separator strips onto the half-mandrel 56a (FIG. 7) at the beginning of the winding operation as has been described. The mandrel normally occupies the position 156, but has been retracted at the instant illustrated in FIG. 11. A feeding device comprising rollers 63, 64 provided with appropriate damping and biasing means serves to displace the guide 140 in direction of arrow f by friction. The position of guide member 158 (corresponding to guide member 58) used for the formation of the winding 61 is shown in full lines at the instant illustrated. It is also in chain lines at 158' in the position which said member 158 must occupy after the winding 61 has been moved in its cup, and a succeeding winding on a next stack of electrode and separator strips is to be wound on the mandrel.

In this embodiment, it is obvious that the rolling advance of the guide 140 along its bench 154 must take place in accordance with the winding speed of the stacked electrode and separator strips being wound which also pull it in the direction of the arrow f.

The invention is in no way limited to the embodiments described and illustrated, which have been referred to only by way of example, the invention also within the scope of the claims including all technical equivalents of the means described, and also combinations thereof, provided that they are made within the spirit and scope of the claimed invention.

What is claimed is:

1. A method of forming a winding of electrodes and separator strips for electrochemical generators having wound electrodes comprising the steps of stacking electrode and separator strips in selected order on a movable guide of elongate form so that leading portions of the separator strips project forwardly of the stack, moving said guide forwardly into proximity of a rotary winding mandrel, engaging the leading portions of the separator strip with the mandrel, rotating said mandrel to wind up the stack thereon while preventing any translatory motion of the stack in relation to the guide, simultaneously effecting a further movement of the guide such as at all times to insure arrival of the stacked electrode and separator strip on the guide tangentially to the spiral winding being formed on said mandrel by the stacked electrode and separator strips.

2. A method of forming a winding electrode and separator strips for an electrochemical generator according to claim 1 wherein said further movement of said guide is a pivotal movement about an axis parallel to that of said mandrel.

3. A method of forming a winding of electrode and separator strips for an electrochemical generator according to claim 1 wherein said further movement of said guide is a translatory motion.

4. A method of forming a winding of electrode and separator strips for an electrochemical generator according to claim 1, including confining the spiral winding upon completion within a cylindrical space defining the final desired diameter of the completed spiral winding, rotating the mandrel and completed spiral winding for a few revolutions in said space, and thereafter ejecting the completed spiral winding from said space directly into a cup constituting a receptacle for an electrochemical generator.

5. An apparatus for forming a spiral winding of stacked electrode and separator strips for an electrochemical generator comprising a movable guide of elongated form on which said electrode and separator strips are stackable with leading portions of the separator strips projecting forwardly of the stack, a rotatable winding mandrel toward which said guide is movable, means for applying and engaging said leading portions of said separator strips by said mandrel whose rotation then effects spiral winding therein of the stacked strips, means for moving said guide during said spiral winding while preventing any translatory movement of the stacked strips in relation to the guide and means for simultaneously imparting a further movement to said guide during said spiral winding such that this further movement combined with the movement of the guide toward the mandrel insures arrival at all times of the stack substantially tangentially to the spiral of stacked electrode and separator strips being wound on said mandrel.

6. An apparatus for forming a spiral winding of stacked electrode and separator strips according to claim 5 wherein said guide is of elongate form and has a receiving surface for said stacked electrode and separator strips, a bench-like support for said guide over which the guide is moved toward said mandrel, pivot means for said bench-like support and means for moving said bench-like support on said pivot means to impart said further movement to said guide.

7. An apparatus for forming a spiral winding of stacked electrode and separator strips according to claim 6, wherein said pivot means has its axis parallel to that of said mandrel and said last-named means apply pressure to said bench-like support to bias it pivotally toward said mandrel.

8. An apparatus for forming a spiral winding of stacked electrode and separator strips according to claim 5 wherein said guide is of elongate form and has a receiving surface for stacked electrode and separator strips, a bench-like support for said guide over which said guide is moved toward said mandrel and means for moving said bench-like support to impart a translatory movement to said guide.

9. An apparatus for forming a spiral winding of stacked electrode and separator strips according to claim 6, including roller means between the guide and bench-like support for permitting rolling movement of said guide on said bench-like support.

10. An apparatus for forming a spiral winding of stacked electrode and separator strips according to claim 6, wherein said receiving surface has a semi-cylindrical recess located in the rear part of the receiving surface in relation to the direction of movement of the guide toward said mandrel to receive substantially half the spiral winding when completed on said mandrel, and an additional guide member having a complementary semi-cylindrical recess overlying said surface in proximity to the mandrel with which said first-named recess defines a cylindrical recess of prescribed diameter within which the spiral winding when completed on said mandrel is confined.

11. An apparatus for forming a spiral winding of stacked electrode and separator strips according to claim 5, in which said means for applying to and engaging said leading portions of said separator strips by said mandrel include air blast means for blowing and leading portions toward said mandrel.

12. An apparatus for forming a spiral winding of stacked electrode and separator strips according to claim 5, including means for retaining the stacked electrode and separator strips on said guide during their winding on the mandrel.

13. An apparatus for forming a spiral winding of stacked electrode and separator strips according to claim 12 wherein said retaining means include suction applying orifices in said guide.

14. An apparatus for forming a spiral winding for stacked electrode and separator strips according to claim 12, wherein said retaining means include permanent magnets on said guide.

15. An apparatus for forming a spiral winding for stacked electrode and separator strips according to claim 12, wherein said retaining means include suction applying orifices in said guide and also permanent magnets on said guide.

16. An apparatus for forming a spiral winding of stacked strips comprising a movable guide having a surface on which said strips are to be positioned in a stack, a rotatable winding mandrel toward which said guide is movable, means for applying to and engaging projecting portions of said strips by said mandrel whose rotation then effects spiral winding thereon of the strips of said stack, means for moving said guide toward said mandrel during spiral winding while preventing any translatory movement of the stack in relation to the guide and means for simultaneously imparting a further movement to said guide during said spiral winding such that this further movement combined with the movement of the guide toward the mandrel insures arrival at all times of the stack substantially tangentially to the spiral being wound on the mandrel.

References Cited
UNITED STATES PATENTS

| | | | |
|---|---|---|---|
| 2,954,417 | 9/1960 | Lehovec et al. | 136—176 |
| 3,298,871 | 1/1967 | Binder et al. | 136—175 |
| 3,373,060 | 3/1968 | Gray | 136—13 |

DONALD L. WALTON, Primary Examiner

U.S. Cl. X.R.

72—147